(12) United States Patent
Zhao et al.

(10) Patent No.: US 9,860,873 B2
(45) Date of Patent: Jan. 2, 2018

(54) D2D DATA TRANSMISSION METHOD AND DEVICE

(71) Applicant: China Academy of Telecommunications Technology, Beijing (CN)

(72) Inventors: Rui Zhao, Beijing (CN); Qiubin Gao, Beijing (CN); Wenhong Chen, Beijing (CN); Ying Peng, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 15/112,106

(22) PCT Filed: Jan. 15, 2015

(86) PCT No.: PCT/CN2015/070793
§ 371 (c)(1),
(2) Date: Jul. 15, 2016

(87) PCT Pub. No.: WO2015/106698
PCT Pub. Date: Jul. 23, 2015

(65) Prior Publication Data
US 2016/0381661 A1 Dec. 29, 2016

(30) Foreign Application Priority Data

Jan. 16, 2014 (CN) .......................... 2014 1 0020048

(51) Int. Cl.
H04W 4/00 (2009.01)
H04W 72/02 (2009.01)
(Continued)

(52) U.S. Cl.
CPC ....... H04W 72/02 (2013.01); H04W 72/0446 (2013.01); H04W 76/023 (2013.01); H04W 84/18 (2013.01); H04W 88/02 (2013.01)

(58) Field of Classification Search
None
See application file for complete search history.

(56) References Cited

U.S. PATENT DOCUMENTS

2005/0177639 A1* 8/2005 Reunamaki ........... H04W 84/18
709/227
2009/0109851 A1* 4/2009 Li ..................... H04W 72/1231
370/235

(Continued)

FOREIGN PATENT DOCUMENTS

CN 102883460 A 1/2013
CN 103188742 A 7/2013

(Continued)

OTHER PUBLICATIONS

International Search Report corresponding to PCT/CN2015/070793, dated Apr. 13, 2015.

(Continued)

Primary Examiner — Bob Phunkulh
(74) Attorney, Agent, or Firm — Kilpatrick Townsend & Stockton LLP

(57) ABSTRACT

Disclosed are a D2D data transmission method and device. The method comprises: determining, by a D2D data sending end, a state of each sending opportunity in a sending window in the same manner as a D2D data receiving end, wherein the sending window is uniformly divided into a plurality of sending opportunities, and the state of each sending opportunity comprises a data sending state and a silent state; and sending D2D data to the D2D data receiving end in the sending opportunity of each data sending state in the sending window. By means of the technical solution provided in the (Continued)

embodiments of the present application, a D2D data sending end sends data on different resources (sending opportunities) or becomes silent, so that different D2D data sending ends are staggered on the resources, thereby alleviating the influence of "near-far" effects.

14 Claims, 2 Drawing Sheets

(51) Int. Cl.
*H04W 72/04* (2009.01)
*H04W 76/02* (2009.01)
*H04W 84/18* (2009.01)
*H04W 88/02* (2009.01)

(56) References Cited

U.S. PATENT DOCUMENTS

| | | | |
|---|---|---|---|
| 2012/0057476 A1* | 3/2012 | Chan | H04W 88/06 370/252 |
| 2013/0235166 A1* | 9/2013 | Jones | H04N 13/04 348/51 |
| 2013/0252656 A1* | 9/2013 | Lee | H04W 4/08 455/519 |
| 2014/0086152 A1* | 3/2014 | Bontu | H04L 1/1812 370/329 |
| 2014/0342747 A1* | 11/2014 | Lee | H04L 5/0053 455/450 |
| 2014/0355483 A1* | 12/2014 | Jang | H04W 8/26 370/254 |
| 2015/0181587 A1 | 6/2015 | Yang et al. | |
| 2016/0198455 A1* | 7/2016 | Caretti | H04W 76/023 370/329 |

FOREIGN PATENT DOCUMENTS

| | | |
|---|---|---|
| CN | 103298081 A | 9/2013 |
| EP | 3068180 A1 | 9/2016 |
| JP | 2003124915 A | 4/2003 |
| JP | 2012525790 A | 10/2012 |
| WO | 2013049959 A1 | 4/2013 |
| WO | 2013191518 A1 | 12/2013 |

OTHER PUBLICATIONS

Translation of PCT Written Opinion for the International Patent Application PCT/CN2015/070793, dated Apr. 15, 2015.
CATT: "Resource allocation for D2D collTilunication", 3GPP Draft; R1-135094, 3rd Generation Partnership Project (3GPP), Mobile Competence Centre ; 650, Route Des Lucioles ; F-06921 Sophia-Antipolis Cedex ; France vol. RAN WG1, No. Guangzhou. China; Oct. 7, 2013-Oct. 11, 2013 Nov. 13, 2013 (Nov. 13, 2013), XP050734797, Retrieved from the Internet: URL:www.3gpp .org/ftp/Meetings_3GPP_SYNC/RAN/RAN1/Docs/ [retrieved on Nov. 13, 2013].
3GPP TSG RAN WG1 Meeting #75, R1-135088, CATT, Details of discovery sequence and message design, 6,2.8.2.1, Discussion and Decision, San Francisco, USA, Nov. 11-15, 2013, 4 pages.
3GPP TSG RAN WG1 Meeting #75, R1-135117, Intel Corporation, On message-based D2D discovery signal design, 6.2.8.2.1, Discussion/Decision, San Francisco, USA, Nov. 11-15 2013, 10 pages.
3GPP TSG RAN WG1 Meeting #75, R1-135176, Design and performance evaluation for D2D broadcast, Alcatel-Lucent Shanghai Bell, Alcatel-Lucent, 6.2.8.1.2, Discussion/Decision, San Francisco, USA, Nov. 11-15, 2013, 7 pages.
3GPP TSG RAN WG1 Meeting #75, R1-135481, Discussion on Resource Allocation in D2D Communications, LG Electronics, 6.2.8.1.3. Discussion and Decision, San Francisco, USA, Nov. 11-15, 2013, 16 pages.

* cited by examiner

D2D DATA TRANSMISSION METHOD AND DEVICE

This application is a US National Stage of International Application No. PCT/CN2015/070793, filed on Jan. 15, 2015, designating the United States, and claiming the benefit of Chinese Patent Applications No. 201410020048.9, filed with the Chinese Patent Office on Jan. 16, 2014 and entitled "D2D Data Transmission Method and Device", both of which are hereby incorporated by reference in their entireties.

FIELD

The present invention relates to the field of wireless communications, and particularly to a method and device for transmitting Device to Device (D2D) data.

BACKGROUND

Device to Device (D2D) communication, i.e., direction communication between user equipments, refers to a mode in which adjacent User Equipments (UEs) can transmit data over a direct link in a short-distance range without the data being forwarded by a central node (i.e., en eNB).

Several typical D2D transmission scenarios in the studies on D2D communication include D2D transmission in coverage-single-cell, in coverage-multi-cell, partial coverage, and out of coverage.

The Long Term Evolution (LTE) D2D technology refers to D2D discovery and communication procedures, controlled by an LTE network, operating in an LTE licensed frequency band. On one hand, the advantages of the D2D technology can be fully utilized, and on the other hand, some problems of the traditional D2D technology, e.g., uncontrollable interference, etc., can be overcome due to the control by the LTE network. The LTE D2D characteristics have been introduced to enable the LTE technology to evolve from the simple radio mobile cellular communication technology toward the universal connectivity technology.

In the LTE D2D system, from the perspectives of a demand for coverage (around 1 kilometer) and a support of Voice over Internet Protocol (VoIP) service (with a small amount of data, and a long period of time for which the service lasts), the LTE D2D system needs to support narrowband transmission, and thus the Frequency Division Multiple Access (FDMA) mode between D2D UEs. Moreover since the position of a transmitting D2D UE (simply Tx UE) in the D2D system is varying, path losses of data transmitted by different Tx UEs up to a receiving D2D UE (simply Rx UE) may significantly differ from each other, so that the "near-far" effect may occur to the Rx UE due to in-band leakage. The so-called "near-far" effect refers to the transmitted data of the Tx UE further from the Rx UE may be affected by in-band leakage from the Tx UE closer to the Rx UE. For example, the Rx UE is receiving the data of the Tx UE 1, and the data of the Tx UE 1 arrives at the Rx UE at the strength of −100 dBmW due to channel fading. The Tx UE 2 nearby the Rx UE also initiates D2D communication concurrently, and the data of the Tx UE 2 arrives at the Rx UE at the strength of −60 dBmW. Even if the transmitted data of the Tx UE 1 and the Tx UE 2 are orthogonal to each other, then the data of the Tx UE 1 will be affected by in-band from such strong in-band leakage from the Tx UE 2 that the Rx UE may not receive the data of the Tx UE 1 correctly.

SUMMARY

An object of the invention is to provide a D2D transmission method and device so as to address such a problem that data transmitted by a remote Tx UE cannot be received correctly.

The object of the invention is attained by the following technical solutions:

A method for transmitting D2D data includes:

determining, by a D2D data transmitter, a state of each transmission occasion in a transmission window in a same way as a D2D data receiver, wherein the transmission window is equally divided into a plurality of transmission occasions, and the state of a transmission occasion includes a data transmission state and a silent state; and transmitting, by the D2D data transmitter, D2D data to the D2D data receiver on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the remoter D2D data transmitter.

Preferably the D2D data transmitter transmits data associated with the same D2D data to the D2D data receiver on each transmission occasion with the data transmission state in the transmission window.

Preferably the D2D data transmitter can further transmit identifier information to the D2D data receiver.

The identifier information can be last N bits of MAC layer address information of the D2D data transmitter; or can be any one of 0 to 503 in a range of values of an initial value of a DMRS; or can be an index of a predefined random seed; or the like.

The identifier information can be initialized identifier information of a scrambling sequence for transmitting the D2D data in the transmission window.

The identifier information can alternatively be initialized identifier information of a DMRS sequence for transmitting the D2D data in the transmission window.

The identifier information can alternatively determine the state of each transmission occasion in the transmission window.

Preferably the D2D data transmitter determines the state of each transmission occasion in the transmission window according to the identifier information in the same way as the D2D data receiver.

Further to any one of the embodiments above of the method, preferably determining, by the D2D data transmitter, the state of each transmission occasion in the transmission window may include: generating, by the D2D data transmitter, a random number for each transmission occasion in the transmission window in the same way as the D2D data receiver; and determining, by the D2D data transmitter, the state of the corresponding transmission occasion according to the generated random number.

Particularly the D2D data transmitter can generate the random number for each transmission occasion in the transmission window according to the identifier information.

Preferably determining, by the D2D data transmitter, the state of each transmission occasion in the transmission window may alternatively include: generating, by the D2D data transmitter, a pseudorandom sequence using the identifier information as an initial value of the pseudorandom sequence, wherein a length of the pseudorandom sequence is the number of transmission occasions in the transmission window, and each bit in the pseudorandom sequence corresponds to one of the transmission occasions in the transmission window; and determining the state of the corresponding transmission occasion according to a value of each bit in the pseudorandom sequence.

It shall be noted that the identifier information which is the initialized identifier information of the scrambling sequence, the identifier information which is the initialized identifier information of the DMRS sequence, and/or the identifier information determining the state of the transmission occasion may or may not be the same identifier information; and if there is different identifier information, then the D2D data transmitter shall transmit the different identifier information respectively to the D2D data receiver.

Preferably determining, by the D2D data transmitter, the state of the corresponding transmission occasion according to the generated random number may include: determining, by the D2D data transmitter, whether the random number reaches a preset threshold, and if so, then determining the state of the corresponding transmission occasion as the data transmission state; otherwise, determining the state of the corresponding transmission occasion as the silent state; or may include: determining, by the D2D data transmitter, whether a result of performing a MOD B operation on the random number is b, wherein B represents an integer number, and b∈(0, B−1); and if so, then determining the state of the corresponding transmission occasion as the data transmission state; otherwise, determining the state of the corresponding transmission occasion as the silent state.

Further to any one of the embodiments above of the method, preferably the length of time of each transmission occasion is one sub-frame.

A method for transmitting D2D data includes:

determining, by a D2D data receiver, a state of each transmission occasion in a transmission window in a same way as a D2D data transmitter, wherein the transmission window is equally divided into a plurality of transmission occasions, and the state of a transmission occasion includes a data transmission state and a silent state; and receiving, by the D2D data receiver, D2D data transmitted by the D2D data transmitter on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the remoter D2D data transmitter.

Preferably if data, associated with the same D2D data, transmitted on each transmission occasion with the data transmission state in the transmission window are of the same redundancy version, then the D2D data receiver can further perform chase combining on the received D2D data; and if data, associated with the same D2D data, transmitted on each transmission occasion with the data transmission state in the transmission window are of different redundancy versions, then the D2D data receiver can further perform IR combining on the received D2D data.

Further to any one of the embodiments above of the receiving method, preferably the D2D data receiver can further receive identifier information transmitted by the D2D data transmitter.

The identifier information can be last N bits of MAC layer address information of the D2D data transmitter; or can be any one of 0 to 503 in a range of values of an initial value of a DMRS; or can be an index of a predefined random seed; or the like.

The identifier information can be initialized identifier information of a scrambling sequence for transmitting the D2D data in the transmission window.

The identifier information can alternatively be initialized identifier information of a DMRS sequence for transmitting the D2D data in the transmission window.

The identifier information can alternatively determine the state of each transmission occasion in the transmission window.

Preferably the D2D data receiver determines the state of each transmission occasion in the transmission window according to the identifier information in the same way as the D2D data transmitter.

Further to any one of the embodiments above of the receiving method, preferably determining, by the D2D data receiver, the state of each transmission occasion in the transmission window may include: generating, by the D2D data receiver, a random number for each transmission occasion in the transmission window in the same way as the D2D data transmitter; and determining, by the D2D data receiver, the state of the corresponding transmission occasion according to the generated random number.

Particularly the D2D data receiver can generate the random number for each transmission occasion in the transmission window according to the identifier information.

Preferably determining, by the D2D data receiver, the state of each transmission occasion in the transmission window may alternatively include: generating, by the D2D data receiver, a pseudorandom sequence using the identifier information as an initial value of the pseudorandom sequence, wherein a length of the pseudorandom sequence is the number of transmission occasions in the transmission window, and each bit in the pseudorandom sequence corresponds to one of the transmission occasions in the transmission window; and determining the state of the corresponding transmission occasion according to a value of each bit in the pseudorandom sequence.

It shall be noted that the identifier information which is the initialized identifier information of the scrambling sequence, the identifier information which is the initialized identifier information of the DMRS sequence, and/or the identifier information determining the state of the transmission occasion may or may not be the same identifier information; and if there is different identifier information, then the D2D data receiver shall receive the different identifier information respectively.

Preferably determining, by the D2D data receiver, the state of the corresponding transmission occasion according to the generated random number may include: determining, by the D2D data receiver, whether the random number reaches a preset threshold, and if so, then determining the state of the corresponding transmission occasion as the data transmission state; otherwise, determining the state of the corresponding transmission occasion as the silent state; or may include: determining, by the D2D data receiver, whether a result of performing a MOD B operation on the random number is b, wherein B represents an integer number, and b∈(0, B−1); and if so, then determining the state of the corresponding transmission occasion as the data transmission state; otherwise, then determining the state of the corresponding transmission occasion as the silent state.

Further to any one of the embodiments above of the receiving method, preferably the length of time of each transmission occasion is one sub-frame.

Based upon the same inventive as the method, an embodiment of the invention further provides a D2D data transmitter, the transmitter including:

a state determining module configured to determine a state of each transmission occasion in a transmission window in a same way as a D2D data receiver, wherein the transmission window is equally divided into a plurality of transmission occasions, and the state of a transmission occasion includes a data transmission state and a silent state; and a data transmitting module configured to transmit D2D data to the D2D data receiver on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the remoter D2D data transmitter.

Preferably the data transmitting module is configured to transmit data associated with the same D2D data to the D2D data receiver on each transmission occasion with the data transmission state in the transmission window.

Preferably the transmitter further includes an identifier information transmitting module configured to transmit identifier information to the D2D data receiver.

Preferably the identifier information is:

last N bits of MAC layer address information of the D2D data transmitter; or any one of 0 to 503 in a range of values of an initial value of a DMRS; or an index of a predefined random seed.

Further to any one of the embodiments above of the D2D data transmitter, preferably the identifier information is initialized identifier information of a scrambling sequence for transmitting the D2D data in the transmission window; and/or the identifier information is initialized identifier information of a DMRS sequence for transmitting the D2D data in the transmission window; and/or the identifier information determines the state of each transmission occasion in the transmission window.

Preferably the state determining module is configured:

to determine the state of each transmission occasion in the transmission window according to the identifier information in the same way as the D2D data receiver.

Further to any one of the embodiments above of the D2D data transmitter, preferably the state determining module is configured:

for the D2D data transmitter to generate a random number for each transmission occasion in the transmission window according to the identifier information in the same way as the D2D data receiver; and for the D2D data transmitter to determine the state of the corresponding transmission occasion according to the generated random number.

If the identifier information transmitting modules transmits the identifier information to the D2D data receiver, then the state determining module configured to determine generate the random number for each transmission occasion in the transmission window is configured:

to determine generate the random number for each transmission occasion in the transmission window according to the identifier information.

Preferably the state determining module configured to determine the state of the corresponding transmission occasion according to the generated random number is configured:

to determine whether the random number reaches a preset threshold, and if so, to determine the state of the corresponding transmission occasion as the data transmission state; otherwise, to determine the state of the corresponding transmission occasion as the silent state; or to determine whether a result of performing a MOD B operation on the random number is b, wherein B represents an integer number, and b∈(0, B−1); and if so, to determine the state of the corresponding transmission occasion as the data transmission state; otherwise, to determine the state of the corresponding transmission occasion as the silent state.

Preferably the state determining module is configured:

to generate a pseudorandom sequence using the identifier information as an initial value of the pseudorandom sequence, wherein a length of the pseudorandom sequence is the number of transmission occasions in the transmission window, and each bit in the pseudorandom sequence corresponds to one of the transmission occasions in the transmission window; and to determine the state of the corresponding transmission occasion according to a value of each bit in the pseudorandom sequence.

Further to any one of the embodiments above of the D2D data transmitter, preferably the length of time of each transmission occasion is one sub-frame.

Based upon the same inventive idea as the method, an embodiment of the invention further provides a D2D UE including a processor and a radio frequency unit, wherein:

the processor is configured to determine a state of each transmission occasion in a transmission window in a same way as a D2D data receiver, wherein the transmission window is equally divided into a plurality of transmission occasions, and the state of a transmission occasion includes a data transmission state and a silent state; and the radio frequency unit is configured to transmit data associated the same D2D data to the D2D data receiver on each transmission occasion with the data transmission state in the transmission window.

In the technical solution according to the embodiment of the invention, the D2D UEs transmit the data or are silent over different resources (transmission occasions) so that the different D2D data transmitters alternate over the resources to thereby alleviate an influence arising from the "near-far" effect, so the D2D data receiver can receive correctly the D2D data transmitted by the remoter D2D data transmitter.

Based upon the same inventive idea as the method, an embodiment of the invention further provides a D2D data receiver, the receiver including:

a state determining module configured to determine a state of each transmission occasion in a transmission window in a same way as a D2D data transmitter, wherein the transmission window is equally divided into a plurality of transmission occasions, and the state of a transmission occasion includes a data transmission state and a silent state; and a data receiving module configured to receive D2D data transmitted by the D2D data transmitter on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the remoter D2D data transmitter.

Preferably the data receiving module is further configured:

when data, associated with the same D2D data, transmitted on each transmission occasion with the data transmission state in the transmission window are of the same redundancy version, to perform chase combining on the received D2D data; and when data, associated with the same D2D data, transmitted on each transmission occasion with the data transmission state in the transmission window are of different redundancy versions, to perform IR combining on the received D2D data.

Further to any one of the embodiments above of the D2D data receiver, preferably the receiver further includes an identifier information receiving module configured to receive identifier information transmitted by the D2D data transmitter.

Preferably the identifier information is:

last N bits of MAC layer address information of the D2D data transmitter; or any one of 0 to 503 in a range of values of an initial value of a DMRS; or an index of a predefined random seed.

Preferably the identifier information is initialized identifier information of a scrambling sequence for transmitting the D2D data in the transmission window; and/or the identifier information is initialized identifier information of a DMRS sequence for transmitting the D2D data in the transmission window; and/or the identifier information determines the state of each transmission occasion in the transmission window.

Preferably the state determining module is configured:

to determine the state of each transmission occasion in the transmission window according to the identifier information in the same way as the D2D data receiver.

Further to any one of the embodiments above of the D2D data receiver, preferably the state determining module is configured:

to generate a random number for each transmission occasion in the transmission window according to the identifier information in the same way as the D2D data transmitter; and to determine the state of the corresponding transmission occasion according to the generated random number.

If the identifier information receiving module receives the identifier information transmitted by the D2D data transmitter, then the state determining module configured to generate the random number for each transmission occasion in the transmission window is configured to generate the random number for each transmission occasion in the transmission window according to the identifier information.

Preferably the state determining module configured to determine the state of the corresponding transmission occasion according to the generated random number is configured:

to determine whether the random number reaches a preset threshold, and if so, to determine the state of the corresponding transmission occasion as the data transmission state; otherwise, to determine the state of the corresponding transmission occasion as the data silent state; or to determine whether a result of performing a MOD B operation on the random number is b, wherein B represents an integer number, and b∈(0, B−1); and if so, to determine the state of the corresponding transmission occasion as the data transmission state; otherwise, to determine the state of the corresponding transmission occasion as the silent state.

Preferably the state determining module is configured:

to generate a pseudorandom sequence using the identifier information as an initial value of the pseudorandom sequence, wherein a length of the pseudorandom sequence is the number of transmission occasions in the transmission window, and each bit in the pseudorandom sequence corresponds to one of the transmission occasions in the transmission window; and to determine the state of the corresponding transmission occasion according to a value of each bit in the pseudorandom sequence.

Further to any one of the embodiments above of the D2D data receiver, preferably the length of time of each transmission occasion is one sub-frame.

Based upon the same inventive idea as the method, an embodiment of the invention further provides a D2D UE including a processor and a radio frequency unit, wherein:

the processor is configured to determine a state of each transmission occasion in a transmission window in a same way as a D2D data transmitter, wherein the transmission window is equally divided into a plurality of transmission occasions, and the state of a transmission occasion includes a data transmission state and a silent state; and the radio frequency unit is configured to receive D2D data transmitted by the D2D data transmitter on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the remoter D2D data transmitter.

A D2D User Equipment (UE) includes a processor, a memory, and a transmitter, wherein the memory is configured to store a preset program, and the processor is configured to read the preset program in the memory, and to execute the program:

to configured to determine a state of each transmission occasion in a transmission window in a same way as a D2D data receiver, where the transmission window is equally divided into a plurality of transmission occasions, and the state of a transmission occasion includes a data transmission state and a silent state; and to instruct the transmitter to transmit D2D data to the D2D data receiver on each transmission occasion with the data transmission state in the transmission window.

A D2D User Equipment (UE) includes a processor, a memory, and a receiver, wherein the memory is configured to store a preset program, and the processor is configured to read the preset program in the memory, and to execute the program:

to determine a state of each transmission occasion in a transmission window in a same way as a D2D data transmitter, where the transmission window is equally divided into a plurality of transmission occasions, and the state of a transmission occasion includes a data transmission state and a silent state; and to instruct the receiver to receive the D2D data transmitted by the D2D data transmitter on each transmission occasion with the data transmission state in the transmission window.

DETAILED DESCRIPTION OF THE EMBODIMENTS

The technical solutions according to the embodiments of the invention will be described below in details with reference to the drawings.

Figure 1:
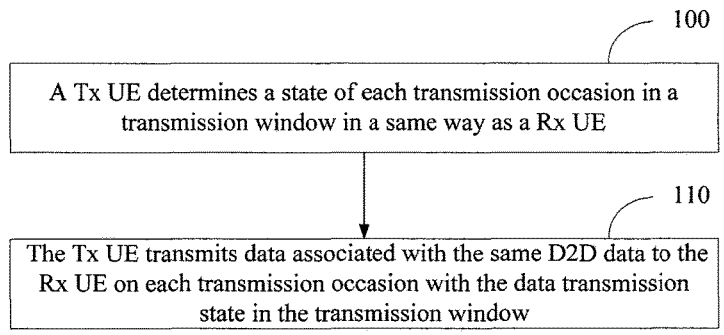
FIG. 1 is a flow chart of a method according to an embodiment of the invention.

FIG. 1 illustrates a method for transmitting D2D data according to an embodiment of the invention, where the method particularly includes the following operations:

In the step 100, a D2D data transmitter (i.e., Tx UE) determines the state of each transmission occasion in a transmission window in the same way as a D2D data receiver (i.e., Rx UE).

Here the transmission window can refer to physical resources in predetermined time and frequency domains, or can refer to a predetermined length of time.

The transmission window is equally divided into a plurality of transmission occasions, where the state of a transmission occasion includes a data transmission state and a silent state. Preferably the transmission window is temporally divided into a plurality of transmission occasions. If the transmission window refers to physical resources in predetermined time and frequency domains, then alternatively the transmission window can be divided in frequency into a plurality of transmission occasions, or can be divided in time and frequency into a plurality of transmission occasions.

In an LTE D2D system, the length of time of a transmission occasion can be but will not be limited to a length of time of one sub-frame (1 millisecond).

Here the state of the transmission occasion determined by the Tx UE refers to the state of the Tx UE on the transmission occasion.

In the step 110, the Tx UE transmits data associated with the same D2D data to the Rx UE on each transmission occasion with the data transmission state in the transmission window.

In a particular implementation, the Tx UE transmits the same D2D data to the Rx UE on each transmission occasion with the data transmission state in the transmission window.

In an embodiment of the invention, the data associated with the same D2D data can refer to D2D data with the same bits of a signal source, and include an initial transmission of the D2D data, a re-transmission of the D2D data with Hybrid Automatic Repeated Request (HARQ)-encoded incremental redundancy version, etc.

In the LTE D2D system, the Tx UE transmits the D2D data respectively over different sub-channels. The bandwidth of a frequency sub-channel can be one or more Physical Resource Blocks (PRBs), e.g., 2, 3, or 4 PRBs.

Here the Tx UE transmits the D2D data with the same source bits of the signal source on each transmission occasion with the data transmission state in the transmission window. However after the D2D data transmitted on each transmission occasion with the data transmission state are modulated, encoded, and rate-matched, then if the same redundancy version is applied, then the same number of bits will be transmitted in reality; and if different redundancy versions are applied, then different numbers of bits will be transmitted in reality. No matter whether the same or different numbers of bits are transmitted in reality, the same bits of the signal source for the D2D data will be transmitted in the transmission window.

Here the size of the transmission window, the division of the transmission window into the transmission occasions, and the redundancy version can be predefined, or can be configured and signaled by an eNB (in the coverage area of a network) or a cluster head (out of the coverage area of the network).

Figure 2:
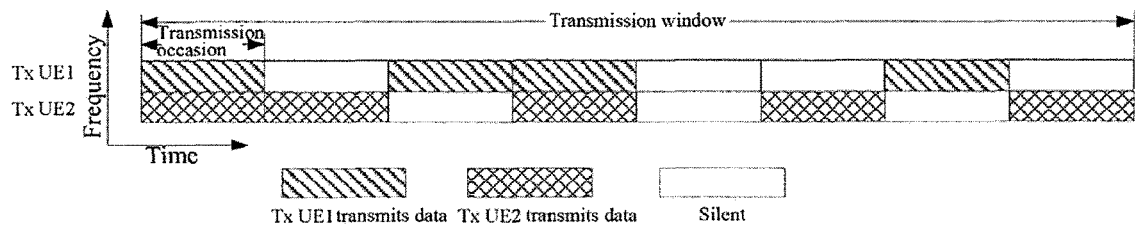
FIG. 2 is a schematic diagram of a transmission window according to an embodiment of the invention.

For example, if the transmission window is temporally divided into a plurality of transmission occasions, then the states of a Tx UE 1 and a Tx UE 2 on the respective transmission occasions in the transmission window will be as illustrated in FIG. 2. As can be apparent, in the technical solution according to the embodiment of the invention, the different Tx UEs transmit the data or are silent over different resources (transmission occasions) so that the different Tx UEs alternate over the resources to thereby alleviate an influence arising from the "near-far" effect, so the Rx UE can receive correctly the D2D data transmitted by the Tx UE further from the Rx UE.

The Tx UE can determine the state of each transmission occasion in the transmission window in a plurality of implementations as long as the Tx UE determines the state in the same way as the Rx UE. In a preferred implementation, the Tx UE can generate a random number for each transmission occasion in the transmission window in the same way as the Rx UE; and the Tx UE can determine the state of the corresponding transmission occasion according to the generated random number. Particularly the Tx UE can generate the random number for each transmission occasion in the transmission window according to the identifier information. In another preferred implementation, the Tx UE can generate a pseudorandom sequence using the identifier information as an initial value of the pseudorandom sequence, where the length of the pseudorandom sequence is the number of transmission occasions in the transmission window, and each bit in the pseudorandom sequence corresponds to one of the transmission occasions in the transmission window; and the Tx UE can determine the state of the corresponding transmission occasion according to the value of each bit in the pseudorandom sequence.

Accordingly the Tx UE can further transmit the identifier information to the Rx UE.

The identifier information determining the state of the transmission state needs to enable the Tx UE to alternate over the resources while avoiding a too high overhead of control signaling. Preferably the identifier information can be last N bits of Media Access Control (MAC) layer address information of the Tx UE; or can be any one of 0 to 503 in a range of values of an initial value of a Demodulation Reference Signal (DMRS); or can be the index of a predefined random seed; or the like.

Preferably the identifier information can alternatively be initialized identifier information of a scrambling sequence for transmitting the D2D data in the transmission window.

Preferably the identifier information can alternatively be initialized identifier information of a DMRS sequence for transmitting the D2D data in the transmission window.

It shall be noted that the identifier information which is the initialized identifier information of the scrambling sequence, the identifier information which is the initialized identifier information of the DMRS sequence, and/or the identifier information determining the state of the transmission occasion may or may not be the same identifier information. Moreover in a real application, the state of the transmission occasion can be determined only by the identifier information, and/or the identifier information can be determined only as the initialized identifier information of the scrambling sequence, and/or the identifier information can be determined only as the initialized identifier information of the DMRS sequence, and the initialized identifier information of the scrambling sequence and the DMRS sequence can also be utilized by cooperating with each other. If there is different identifier information, then the Tx UE will transmit the different identifier information respectively to the Rx UE.

In the embodiment above, the Tx UE can generate the random number for each transmission occasion in the transmission window according to the identifier information in a plurality of implementations, and preferably the Tx UE can generate the random number $Y_k$ for each transmission occasion in the transmission window in the equation of:

$$Y_k = (A \cdot Y_{k-1}) \bmod D,$$

Where if k is 1, then $Y_{k-1} = Y_{-1}$, and $Y_{-1} = n_{id}$ with $n_{id}$ representing the identifier information; A=39827, and D=65537; and k represents the number of the transmission occasion in the transmission window.

In the embodiment above, the Tx UE can determine the state of the corresponding transmission occasion according to the generated random number in a plurality of implementations. In a preferred implementation, the Tx UE can determine whether the random number reaches a preset threshold, and if so, then the Tx UE will determine the state of the corresponding transmission occasion as the data transmission state; otherwise, the Tx UE will determine the state of the corresponding transmission occasion as the silent state. Taking the random number $Y_k$ determined in the equation above as an example, if the probability that the Tx UE transmits the D2D data on a transmission occasion is defined as a (a represents a real number ranging from 0 to 1, which can be predefined or configured), then if $Y^k/D < \alpha$, then the state of the Tx UE on the transmission occasion k will be determined as the data transmission state; otherwise, the state of the Tx UE on the transmission occasion k will be determined as the silent state. In another preferred implementation, the Tx UE can determine whether a result of performing a MOD B operation on the random number is b, where B represents an integer number, and b∈(0, B−1); and if so, then the Tx UE will determine the state of the corresponding transmission occasion as the data transmission state; otherwise, the Tx UE will determine the state of the corresponding transmission occasion as the silent state.

Figure 3:
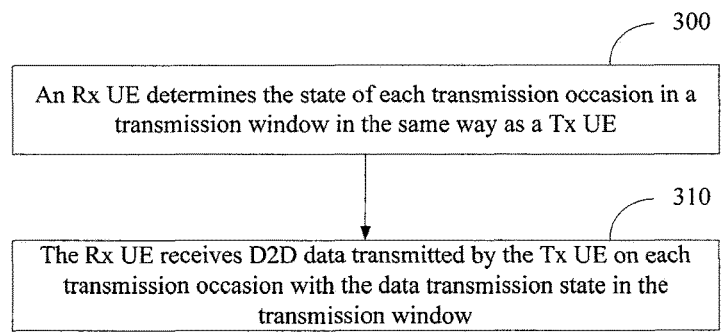
FIG. 3 is a flow chart of another method according to an embodiment of the invention.

FIG. 3 illustrates another method for transmitting D2D data according to an embodiment of the invention, where the method particularly includes the following operations:

In the step 300, an Rx UE determines the state of each transmission occasion in a transmission window in the same way as a Tx UE.

Here the transmission window is equally divided into a plurality of transmission occasions, where the state of a transmission occasion includes a data transmission state and a silent state.

The size of the transmission window, the division of the transmission window into the transmission occasions, and other configuration information can be predefined, or can be configured by an eNB (in the coverage area of a network) or a cluster head (out of the coverage area of the network).

In the step 310, the Rx UE receives the D2D data transmitted by the Tx UE on each transmission occasion with the data transmission state in the transmission window.

In the technical solution according to the embodiment of the invention, the Tx UEs transmit the data or are silent over different resources (transmission occasions) so that the different Tx UEs alternate over the resources to thereby alleviate an influence arising from the "near-far" effect, so the Rx UE can receive correctly the D2D data transmitted by the Tx UE further from the Rx UE.

Preferably if data, associated with the same D2D data, transmitted on each transmission occasion with the data transmission state in the transmission window are of the same redundancy version, then the Rx UE can further perform chase combining on the received D2D data; and if data, associated with the same D2D data, transmitted on each transmission occasion with the data transmission state in the transmission window are of different redundancy versions, then the Rx UE can further perform Incremental Redundancy (IR) combining on the received D2D data.

Further to any one of the embodiments above of the receiving method, preferably the Rx UE can further receive identifier information transmitted by the Tx UE.

The identifier information can be last N bits of MAC layer address information of the Tx UE; or can be any one of 0 to 503 in a range of values of an initial value of a DMRS; or can be the index of a predefined random seed; or the like.

The identifier information can alternatively be initialized identifier information of a scrambling sequence for transmitting the D2D data in the transmission window.

The identifier information can alternatively be initialized identifier information of a DMRS sequence for transmitting the D2D data in the transmission window.

Further to any one of the embodiments above of the receiving method, preferably the Rx UE can determine the state of each transmission occasion in the transmission window in such an implementation that the Rx UE generates a random number for each transmission occasion in the transmission window in the same way as the Tx UE; and the Rx UE determines the state of the corresponding transmission occasion according to the generated random number.

Particularly the Rx UE can generate the random number for each transmission occasion in the transmission window according to the identifier information.

Preferably the Rx UE can determine the state of each transmission occasion in the transmission window in such another implementation that the Rx UE generates a pseudorandom sequence using the identifier information as an initial value of the pseudorandom sequence, where the length of the pseudorandom sequence is the number of transmission occasions in the transmission window, and each bit in the pseudorandom sequence corresponds to one of the transmission occasions in the transmission window;

and the Rx UE determines the state of the corresponding transmission occasion according to the value of each bit in the pseudorandom sequence.

It shall be noted that the identifier information which is the initialized identifier information of the scrambling sequence, the identifier information which is the initialized identifier information of the DMRS sequence, and/or the identifier information determining the state of the transmission occasion may or may not be the same identifier information. If there is different identifier information, then the Rx UE will receive the different identifier information respectively.

Preferably, the Rx UE can determine the state of the corresponding transmission occasion according to the generated random number in a plurality of particular implementations, and reference can be made to the description of the embodiment above at the Tx UE side for details thereof. In an implementation thereof, the Rx UE can determine whether the random number reaches a preset threshold, and if so, then the Rx UE will determine the state of the corresponding transmission occasion as the data transmission state; otherwise, the Rx UE will determine the state of the corresponding transmission occasion as the silent state. In another preferred implementation, the Rx UE can determine whether a result of performing a MOD B operation on the random number is b, where B represents an integer number, and b∈(0, B−1); and if so, then the Rx UE will determine the state of the corresponding transmission occasion as the data transmission state; otherwise, the Rx UE will determine the state of the corresponding transmission occasion as the silent state.

Further to any one of the embodiments above of the receiving method, preferably the length of time of each transmission occasion is one sub-frame.

The methods according to the embodiments of the invention will be described below in details in connection with a particular application scenario thereof.

Figure 4:
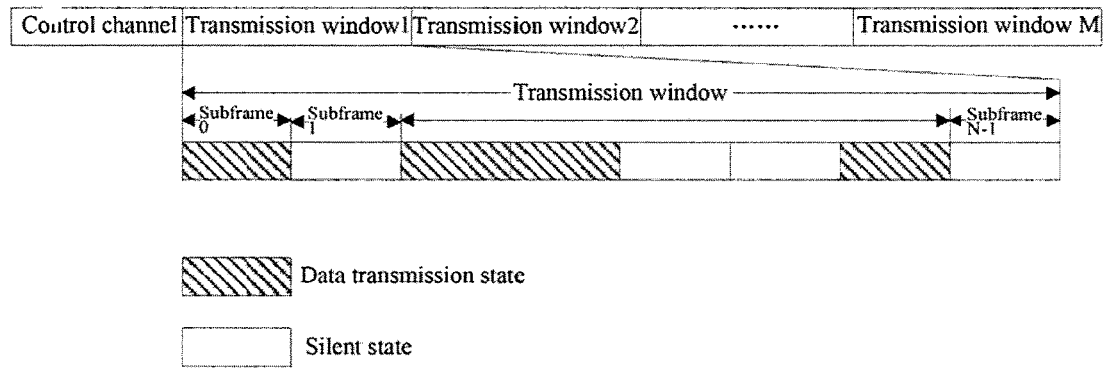
FIG. 4 is a schematic structural diagram of a D2D communication frame according to an embodiment of the invention.

As illustrated in FIG. 4, a D2D communication frame includes a control channel, and at least one transmission window. The transmission window further includes a plurality of sub-frames, each of which is a transmission occasion.

In the frame structure illustrated in FIG. 4, a Tx UE transmits identifier information determining the states of the sub-frames, before D2D data are transmitted. Of course, the Tx UE can alternatively transmit or be silent over the control channel like the transmission window. However if the Tx UE transmits over the control channel, then an Rx UE may not know the priori identifier information, so the Rx UE cannot determine the state of the control channel, and has to receive throughout a length of time for which the Tx RE may transmit over the control channel, until the Rx UE receives the identifier information or other control information correctly. For the data in the transmission window, the Tx UE determines the state of each sub-frame in the methods according to the embodiments above, and further transmits the D2D data in the sub-frames with the data transmission state. If the length of the transmission window is N sub-frames, and if the transmitted data are of the same redundancy version, then all the data transmitted in the same transmission window are data with the same bits of a signal source. The Rx UE will determine a pattern of the states of the Tx UE in the sub-frames in the same transmission window according to the identifier received in the control channel, and further receive the data in the corresponding sub-frames with the data transmission state, and the Rx UE can merge the transmitted data according to their redundancy versions to thereby improve the reliability of receiving the data.

Figure 5:
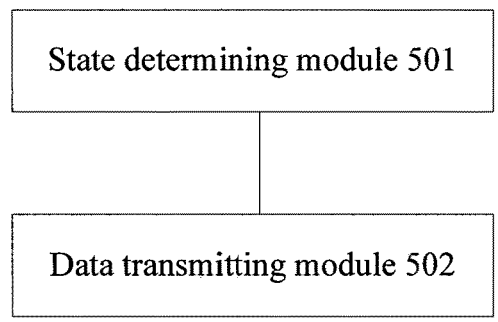
FIG. 5 is a schematic diagram of a D2D data transmitter according to an embodiment of the invention.

Based upon the same inventive idea as the method, an embodiment of the invention further provides a D2D data transmitter as illustrated in FIG. 5, where the transmitter includes:

A state determining module 501 is configured to determine the state of each transmission occasion in a transmission window in the same way as a D2D data receiver, where the transmission window is equally divided into a plurality of transmission occasions, and the state of a transmission occasion includes a data transmission state and a silent state; and A data transmitting module 502 is configured to transmit the D2D data to the D2D data receiver on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the remoter D2D data transmitter.

Preferably the data transmitting module is configured to transmit data associated with the same D2D data to the D2D data receiver on each transmission occasion with the data transmission state in the transmission window.

Preferably the D2D data transmitter further includes an identifier information transmitting module configured to transmit identifier information to the D2D data receiver.

Preferably the identifier information is:

Last N bits of MAC layer address information of the D2D data transmitter; or

Any one of 0 to 503 in a range of values of an initial value of a DMRS; or

The index of a predefined random seed.

Further to any one of the embodiments above of the D2D data transmitter, preferably the identifier information is initialized identifier information of a scrambling sequence for transmitting the D2D data in the transmission window; and/or the identifier information is initialized identifier information of a DMRS sequence for transmitting the D2D data in the transmission window.

Further to any one of the embodiments above of the D2D data transmitter, preferably the state determining module 501 is configured:

For the D2D data transmitter to generate a random number for each transmission occasion in the transmission window in the same way as the D2D data receiver; and For the D2D data transmitter to determine the state of the corresponding transmission occasion according to the generated random number.

If the identifier information transmitting module transmits the identifier information to the D2D data receiver, then the state determining module 501 configured to generate the random number for each transmission occasion in the transmission window is configured:

To generate the random number for each transmission occasion in the transmission window according to the identifier information.

Preferably the state determining module 501 configured to determine the state of the corresponding transmission occasion according to the generated random number is configured:

To determine whether the random number reaches a preset threshold, and if so, to determine the state of the corresponding transmission occasion as the data transmission state; otherwise, to determine the state of the corresponding transmission occasion as the silent state; or To determine whether a result of performing a MOD B operation on the random number is b, where B represents an integer number, and b∈(0, B−1); and if so, to determine the state of the corresponding transmission occasion as the data transmission state; otherwise, to determine the state of the corresponding transmission occasion as the silent state.

Preferably the state determining module 501 is configured:

To generate a pseudorandom sequence using the identifier information as an initial value of the pseudorandom sequence, where the length of the pseudorandom sequence is the number of transmission occasions in the transmission window, and each bit in the pseudorandom sequence corresponds to one of the transmission occasions in the transmission window; and To determine the state of the corresponding transmission occasion according to the value of each bit in the pseudorandom sequence.

Further to any one of the embodiments of the D2D data transmitter, preferably the length of time of each transmission occasion is one sub-frame.

Based upon the same inventive idea as the method, an embodiment of the invention further provides a D2D UE including a processor, a memory, and a transmitter, where the memory is configured to store a preset program, and the processor is configured to read the preset program in the memory, and to execute the program:

To configured to determine the state of each transmission occasion in a transmission window in the same way as a D2D data receiver, where the transmission window is equally divided into a plurality of transmission occasions, and the state of a transmission occasion includes a data transmission state and a silent state; and To instruct the transmitter to transmit the D2D data to the D2D data receiver on each transmission occasion with the data transmission state in the transmission window.

In the technical solution according to the embodiment of the invention, the D2D UEs transmit the data or are silent over different resources (transmission occasions) so that the different D2D UEs alternate over the resources to thereby alleviate an influence arising from the "near-far" effect, so the D2D data receiver can receive correctly the D2D data transmitted by the remoter D2D data transmitter.

Preferably the processor instructs the transmitter to transmit data associated with the same D2D data to the D2D data receiver on each transmission occasion with the data transmission state in the transmission window.

Figure 6:
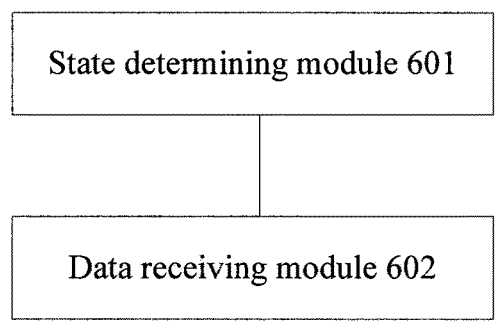
FIG. 6 is a schematic diagram of a D2D data receiver according to an embodiment of the invention.

Based upon the same inventive idea as the method, an embodiment of the invention further provides a D2D data receiver as illustrated in FIG. 6, where the receiver includes:

A state determining module 601 is configured to determine the state of each transmission occasion in a transmission window in the same way as a D2D data transmitter, where the transmission window is equally divided into a plurality of transmission occasions, and the state of a transmission occasion includes a data transmission state and a silent state; and A data receiving module 602 is configured to receive the D2D data transmitted by the D2D data transmitter on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the Tx UE further from the Rx UE.

Preferably the data receiving module 602 is further configured:

If data, associated with the same D2D data, transmitted on each transmission occasion with the data transmission state in the transmission window are of the same redundancy version, to perform chase combining on the received D2D data; and If data, associated with the same D2D data, transmitted on each transmission occasion with the data transmission state in the transmission window are of different redundancy versions, to perform IR combining on the received D2D data.

Further to any one of the embodiments above of the D2D data receiver, preferably the D2D data receiver further includes an identifier information receiving module configured to receive identifier information transmitted by the D2D data transmitter.

Preferably the identifier information is:

Last N bits of MAC layer address information of the D2D data transmitter; or

Any one of 0 to 503 in a range of values of an initial value of a DMRS; or

The index of a predefined random seed.

Preferably the identifier information is initialized identifier information of a scrambling sequence for transmitting the D2D data in the transmission window; and/or the identifier information is initialized identifier information of a DMRS sequence for transmitting the D2D data in the transmission window.

Further to any one of the embodiments above of the D2D data receiver, preferably the state determining module 601 is configured:

To generate a random number for each transmission occasion in the transmission window in the same way as the D2D data transmitter; and To determine the state of the corresponding transmission occasion according to the generated random number.

If the identifier information receiving module receives the identifier information transmitted by the D2D data transmitter, then the state determining module configured to determine the random number for each transmission occasion in the transmission window is configured to generate the random number for each transmission occasion in the transmission window according to the identifier information.

Preferably the state determining module 601 configured to determine the state of the corresponding transmission occasion according to the generated random number is configured:

To determine whether the random number reaches a preset threshold, and if so, to determine the state of the corresponding transmission occasion as the data transmission state; otherwise, to determine the state of the corresponding transmission occasion as the silent state; or To determine whether a result of performing a MOD B operation on the random number is b, where B represents an integer number, and b∈(0, B−1); and if so, to determine the state of the corresponding transmission occasion as the data transmission state; otherwise, to determine the state of the corresponding transmission occasion as the silent state.

Preferably the state determining module 601 is configured:

To generate a pseudorandom sequence using the identifier information as an initial value of the pseudorandom sequence, where the length of the pseudorandom sequence is the number of transmission occasions in the transmission window, and each bit in the pseudorandom sequence corresponds to one of the transmission occasions in the transmission window; and To determine the state of the corresponding transmission occasion according to the value of each bit in the pseudorandom sequence.

Further to any one of the embodiments of the D2D data transmitter, preferably the length of time of each transmission occasion is one sub-frame.

Based upon the same inventive idea as the method, an embodiment of the invention further provides a D2D UE including a processor, a memory, and a receiver, where the memory is configured to store a preset program, and the processor is configured to read the preset program in the memory, and to execute the program:

To determine the state of each transmission occasion in a transmission window in the same way as a D2D data transmitter, where the transmission window is equally divided into a plurality of transmission occasions, and the state of a transmission occasion includes a data transmission state and a silent state; and To instruct the receiver to receive the D2D data transmitted by the D2D data transmitter on each transmission occasion with the data transmission state in the transmission window.

In the technical solution according to the embodiment of the invention, the D2D data transmitters transmit the data or are silent over different resources (transmission occasions) so that the different D2D data transmitters alternate over the resources to thereby alleviate an influence arising from the "near-far" effect, so the D2D data receiver can receive correctly the D2D data transmitted by the Tx UE further from the Rx UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting D2D data, comprising:
determining, by a D2D data transmitter, a state of each transmission occasion in a transmission window in a same way as a D2D data receiver, wherein the transmission window is equally divided into a plurality of transmission occasions, and the state of a transmission occasion comprises a data transmission state and a silent state; and
transmitting, by the D2D data transmitter, D2D data to the D2D data receiver on each transmission occasion with the data transmission state in the transmission window;
wherein the method further comprises:
transmitting, by the D2D data transmitter, identifier information to the D2D data receiver;
wherein the identifier information is initialized identifier information of a scrambling sequence for transmitting the D2D data in the transmission window; and/or
the identifier information is initialized identifier information of a DMRS sequence for transmitting the D2D data in the transmission window; and/or
the identifier information determines the state of each transmission occasion in the transmission window;
wherein the identifier information which is the initialized identifier information of the scrambling sequence for transmitting the D2D data in the transmission window, the identifier information which is the initialized identifier information of the DMRS sequence for transmitting the D2D data in the transmission window, and/or the identifier information determining the state of the each transmission occasion are or are not the same identifier information; and
when there is different identifier information, transmitting, by the D2D data transmitter, the identifier information to the D2D data receiver comprises:

transmitting, by the D2D data transmitter, the different identifier information respectively to the D2D data receiver.

2. The method according to claim 1, wherein transmitting, by the D2D data transmitter, the D2D data to the D2D data receiver on each transmission occasion with the data transmission state in the transmission window comprises:
   transmitting, by the D2D data transmitter, data associated with the same D2D data to the D2D data receiver on each transmission occasion with the data transmission state in the transmission window.

3. The method according to claim 1, wherein the identifier information is:
   last N bits of MAC layer address information of the D2D data transmitter; or
   any one of 0 to 503 in a range of values of an initial value of a DMRS; or
   an index of a predefined random seed.

4. The method according to claim 1, wherein determining, by the D2D data transmitter, the state of each transmission occasion in the transmission window in the same way as the D2D data receiver comprises:
   determining, by the D2D data transmitter, the state of each transmission occasion in the transmission window according to the identifier information in the same way as the D2D data receiver.

5. The method according to claim 4, wherein determining, by the D2D data transmitter, the state of each transmission occasion in the transmission window in the same way as the D2D data receiver comprises:
   generating, by the D2D data transmitter, a random number for the each transmission occasion in the transmission window according to the identifier information in the same way as the D2D data receiver; and
   determining, by the D2D data transmitter, the state of corresponding transmission occasion according to the generated random number.

6. The method according to claim 1, wherein determining, by the D2D data transmitter, the state of the each transmission occasion in the transmission window in the same way as the D2D data receiver comprises:
   generating, by the D2D data transmitter, a pseudorandom sequence using the identifier information as an initial value of the pseudorandom sequence, wherein a length of the pseudorandom sequence is the number of transmission occasions in the transmission window, and each bit in the pseudorandom sequence corresponds to one of the transmission occasions in the transmission window; and
   determining the state of the corresponding transmission occasion according to a value of each bit in the pseudorandom sequence.

7. A method for transmitting D2D data, comprising:
   determining, by a D2D data receiver, a state of each transmission occasion in a transmission window in a same way as a D2D data transmitter, wherein the transmission window is equally divided into a plurality of transmission occasions, and the state of a transmission occasion comprises a data transmission state and a silent state; and
   receiving, by the D2D data receiver, D2D data transmitted by the D2D data transmitter on each transmission occasion with the data transmission state in the transmission window;
   wherein the method further comprises:
   receiving, by the D2D data receiver, identifier information transmitted by the D2D data transmitter;
   wherein the identifier information is initialized identifier information of a scrambling sequence for transmitting the D2D data in the transmission window; and/or
   the identifier information is initialized identifier information of a DMRS sequence for transmitting the D2D data in the transmission window; and/or
   the identifier information determines the state of each transmission occasion in the transmission window;
   wherein the identifier information which is the initialized identifier information of the scrambling sequence for transmitting the D2D data in the transmission window, the identifier information which is the initialized identifier information of the DMRS sequence for transmitting the D2D data in the transmission window, and/or the identifier information determining the state of the each transmission occasion are or are not the same identifier information; and
   when there is different identifier information, receiving, by the D2D data receiver, the identifier information transmitted by the D2D data transmitter comprises:
   receiving, by the D2D data receiver, the different identifier information transmitted by the D2D data transmitter respectively.

8. The method according to claim 7, wherein the method further comprises:
   when data, associated with the same D2D data, transmitted on each transmission occasion with the data transmission state in the transmission window are of the same redundancy version, performing chase combining on received D2D data; and
   when data, associated with the same D2D data, transmitted on each transmission occasion with the data transmission state in the transmission window are of different redundancy versions, performing Incremental Redundancy combining on the received D2D data.

9. The method according to claim 7, wherein the identifier information is:
   last N bits of MAC layer address information of the D2D data transmitter; or
   any one of 0 to 503 in a range of values of an initial value of a DMRS; or
   an index of a predefined random seed.

10. The method according to claim 7, wherein determining, by the D2D data receiver, the state of each transmission occasion in the transmission window in the same way as the D2D data transmitter comprises:
    determining, by the D2D data receiver, the state of each transmission occasion in the transmission window according to the identifier information in the same way as the D2D data transmitter.

11. The method according to claim 7, wherein determining, by the D2D data receiver, the state of each transmission occasion in the transmission window in the same way as the D2D data transmitter comprises:
    generating, by the D2D data receiver, a random number for the each transmission occasion in the transmission window according to the identifier information in the same way as the D2D data transmitter; and
    determining, by the D2D data receiver, the state of corresponding transmission occasion according to the generated random number.

12. The method according to claim 7, wherein determining the state of the each transmission occasion in the transmission window comprises:
    generating, by the D2D data receiver, a pseudorandom sequence using the identifier information as an initial value of the pseudorandom sequence, wherein a length of the pseudorandom sequence is the number of transmission occasions in the transmission window, and each bit in the pseudorandom sequence corresponds to one of the transmission occasions in the transmission window; and determining the state of the corresponding transmission occasion according to a value of each bit in the pseudorandom sequence.

13. A D2D User Equipment (UE), comprising a processor, a memory, and a transmitter, wherein the memory is configured to store a preset program, and the processor is configured to read the preset program in the memory, and to execute the program:

to configured to determine a state of each transmission occasion in a transmission window in a same way as a D2D data receiver, wherein the transmission window is equally divided into a plurality of transmission occasions, and the state of a transmission occasion includes a data transmission state and a silent state; and to instruct the transmitter to transmit D2D data to the D2D data receiver on each transmission occasion with the data transmission state in the transmission window;

wherein the processor is further configured to read the preset program in the memory, and to execute the program:

to instruct the transmitter to transmit identifier information to the D2D data receiver;

wherein the identifier information is initialized identifier information of a scrambling sequence for transmitting the D2D data in the transmission window; and/or the identifier information is initialized identifier information of a DMRS sequence for transmitting the D2D data in the transmission window; and/or the identifier information determines the state of each transmission occasion in the transmission window;

wherein the identifier information which is the initialized identifier information of the scrambling sequence for transmitting the D2D data in the transmission window, the identifier information which is the initialized identifier information of the DMRS sequence for transmitting the D2D data in the transmission window, and/or the identifier information determining the state of the each transmission occasion are or are not the same identifier information; and when there is different identifier information, the processor is further configured to read the preset program in the memory, and to execute the program:

to instruct the transmitter to transmit the different identifier information respectively to the D2D data receiver.

14. A D2D User Equipment (UE), comprising a processor, a memory, and a receiver, wherein the memory is configured to store preset program, and the processor is configured to read the preset program in the memory, and to execute the program:

to determine a state of each transmission occasion in a transmission window in a same way as a D2D data transmitter, where the transmission window is equally divided into a plurality of transmission occasions, and the state of a transmission occasion includes a data transmission state and a silent state; and to instruct the receiver to receive D2D data transmitted by the D2D data transmitter on each transmission occasion with the data transmission state in the transmission window;

wherein the processor is further configured to read the preset program in the memory, and to execute the program:

to instruct the receiver to receive identifier information transmitted by the D2D data transmitter;

wherein the identifier information is initialized identifier information of a scrambling sequence for transmitting the D2D data in the transmission window; and/or the identifier information is initialized identifier information of a DMRS sequence for transmitting the D2D data in the transmission window; and/or the identifier information determines the state of each transmission occasion in the transmission window;

wherein the identifier information which is the initialized identifier information of the scrambling sequence for transmitting the D2D data in the transmission window, the identifier information which is the initialized identifier information of the DMRS sequence for transmitting the D2D data in the transmission window, and/or the identifier information determining the state of the each transmission occasion are or are not the same identifier information; and when there is different identifier information, the processor is further configured to read the preset program in the memory, and to execute the program:

to instruct the receiver to receive the different identifier information transmitted by the D2D data transmitter respectively.

* * * * *